United States Patent [19]

Haining

[11] Patent Number: 5,440,176

[45] Date of Patent: Aug. 8, 1995

[54] OCEAN CURRENT POWER GENERATOR

[76] Inventor: Michael L. Haining, 6731 Ashmore, Houston, Tex. 77069

[21] Appl. No.: 324,978

[22] Filed: Oct. 18, 1994

[51] Int. Cl.⁶ .......................................... F03B 13/10
[52] U.S. Cl. ...................................... 290/54; 290/42; 290/43; 290/53; 415/7; 415/126; 416/121
[58] Field of Search ..................... 290/42, 43, 53, 54; 415/7, 60, 126; 416/121, 130

[56] References Cited

U.S. PATENT DOCUMENTS

| 400,209 | 3/1889 | Haskins | 415/126 |
| 966,042 | 8/1910 | McClung | 416/121 |
| 969,794 | 9/1910 | Miner | 415/126 |
| 1,123,491 | 1/1915 | Corbin | 290/54 |
| 2,501,696 | 3/1950 | Souczek | 290/43 |
| 4,025,220 | 5/1977 | Thompson et al. | 415/7 |
| 4,219,303 | 8/1980 | Mouton, Jr. et al. | 416/121 |
| 4,256,970 | 3/1981 | Tomassini | 290/53 |
| 4,306,157 | 12/1981 | Wracsaricht | 290/54 |
| 4,313,059 | 1/1982 | Howard | 290/54 |
| 4,335,319 | 6/1982 | Mettersheimer, Jr. | 290/54 |

FOREIGN PATENT DOCUMENTS

8100595  3/1981  WIPO ................................. 290/54

Primary Examiner—Todd DeBoer
Assistant Examiner—Robert Lloyd Hoover
Attorney, Agent, or Firm—Richard L. Moseley

[57] ABSTRACT

An hydroelectric power plant is disclosed which comprises several combination turbine/generators which are suspended into an ocean current from a submerged tension leg type platform. Each of the turbine/generators are independently positionable horizontally, vertically and azimuthally to take the best advantage of the ocean current at any given time for generating electricity.

6 Claims, 8 Drawing Sheets

OCEAN CURRENT POWER GENERATOR

BACKGROUND OF THE INVENTION

1. Field of the Invention

The present invention relates to electrical power generation plants, particularly those that utilize the flow of water to power turbines that drive electrical generators. More particularly, the invention relates to a hydroelectric power generation plant which utilizes the flow of an ocean current to drive the turbines in the plant. More particularly the invention relates to a power plant which is completely submerged in the ocean current having all of the control functions located on land.

2. Related Information

The use of ocean currents to generate electrical power has been contemplated for some time. For instance Mettersheimer in U.S. Pat. No. 4,335,319 proposes a packaged power plant in which the turbine is the only major component which is submerged in order to reduce corrosion. Mettersheimer particularly discloses a special nozzle and positioning device which can be moved about to take advantage of an current as it moves. In is of note that Mettersheimer must be positioned in shallow enough water such that a platform rests on legs with the platform above the water level.

Mouton in U.S. Pat. No. 4,219,303 discloses a submarine turbine power plant which is anchored by cable to the ocean floor and buoyed upward into the current. A special thick walled nozzle structure is used to house the turbine and related equipment and to direct the water flow over the turbine.

Wracsaricht in U.S. Pat. No. 4,306,157 discloses a special turbine for use with slow water currents making it especially useful for harnessing the ocean current.

SUMMARY OF THE INVENTION

The power plant of the present invention comprises a tension leg type platform from which are suspended several combination turbine/generators. Each turbine/generator is independently suspended such that it may be raised or lowered independently of the others. In addition each turbine/generator may be moved laterally independently of the others. Finally, the individual turbine/generators my be rotated in the horizontal plane. The multiplicity of turbine/generators and their relative positioning provides a flexible subsea hydroelectric generating plant that can take advantage of an ocean current with its mild movements over the course of time.

The control station of the subsea hydroelectric plant may be located on shore or above the water. Standard power generation control computers are located in the remote control station. In addition to the standard power generation control computers, there is provided a program which contains the plotted movement of the ocean current at the location where the subsea hydroelectric plant is located. The program provides information as to the depth and direction of the current through the year. This information is used to automatically locate the individual turbine/generators to best utilize the current. In addition, the plurality of the turbine/generators allows service on one while the others are in operation.

PREFERRED EMBODIMENTS

Figure 1:
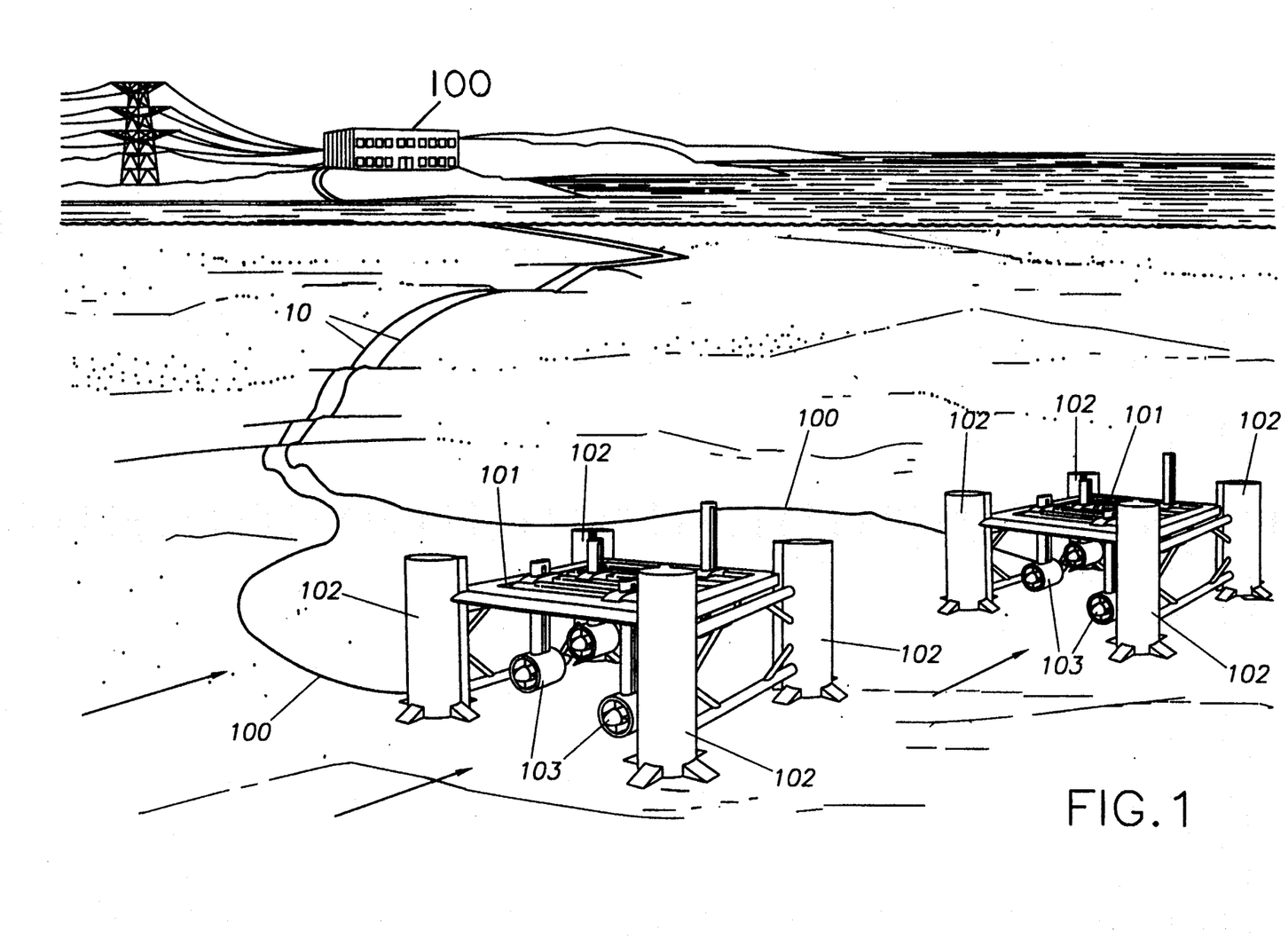
FIG. 1 is an artists rendition of the subsea hydroelectric plant as located on the ocean floor.

Referring first to FIG. 1 there are shown two subsea hydroelectric generating platforms 101 supported on the ocean floor by tension legs 102. Turbine/generators 103 are suspended from the platforms 101 and oriented into the ocean current at the location. The platforms 101 are connected to a remote control center 100 by cables 104 which carry the generated current to shore and carry control signals to the platform. The generated current is fed into the grid as required by the control center.

The control center contains all of the standard power generation control computers to run the turbine/generators on the platforms. Additionally the control center computer contains a program which contains the plotted movement of the ocean current at the location of the platforms. The program provides information that is transmitted to the platforms that positions each of the turbine/generators in the current to take advantage of the strongest current and generate electricity most efficiently.

Figure 2:
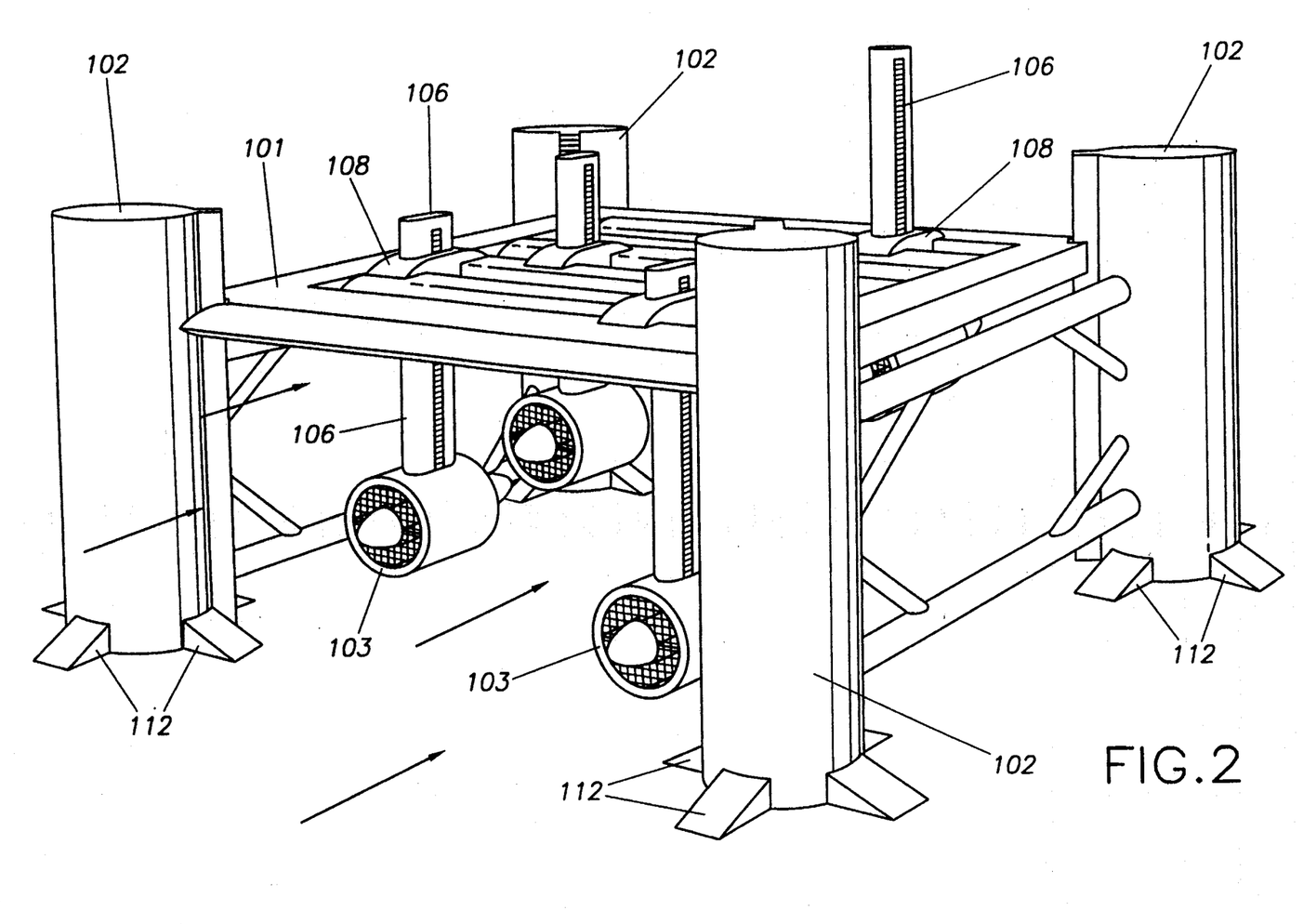
FIG. 2 is an isometric view of one embodiment of the subsea hydroelectric plant of the present invention.

Referring now to FIG. 2 there is shown a more detailed view of one embodiment of the subsea hydroelectric plants. The platform 101 is supported on the ocean floor by four tension legs 102 which are leveled on the floor by extensions 112. Tension leg platform technology is well known in the off shore oil and gas exploration/production industry. The only difference between the standard off shore platforms is that in the present invention the platform is totally submerged.

The platform 101 is shown to support by suspension a plurality of turbine/generators 103. The turbine/generators 103 are suspended from the platform 101 by vertical columns 106 which in turn are carried by moveable carriages 108. Within in the carriages are jacking mechanisms which can lower and raise the turbine/generators.

Figure 3:
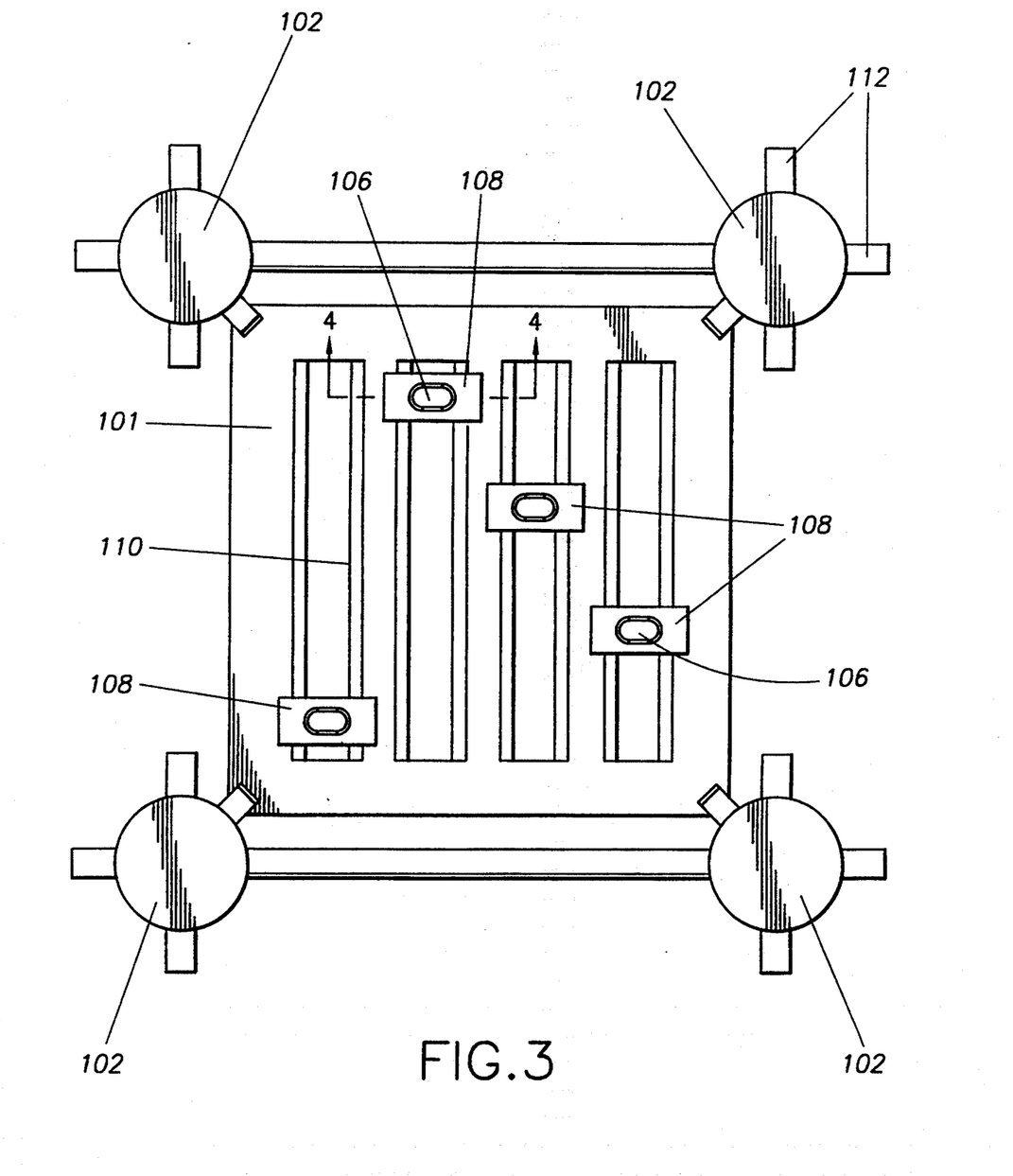
FIG. 3 is a top plan view of the subsea hydroelectric plant shown in FIG. 1.

In FIG. 3 a top plan view of the embodiment of FIG. 2 is shown. The platform 101 is supported at the corners by tension legs 102. Across the platform 101 are lateral supports 110 on which the carriages 108 ride. Lateral movement of the carriages 108 may be provided by hydraulic or other mechanical means.

Figure 4:
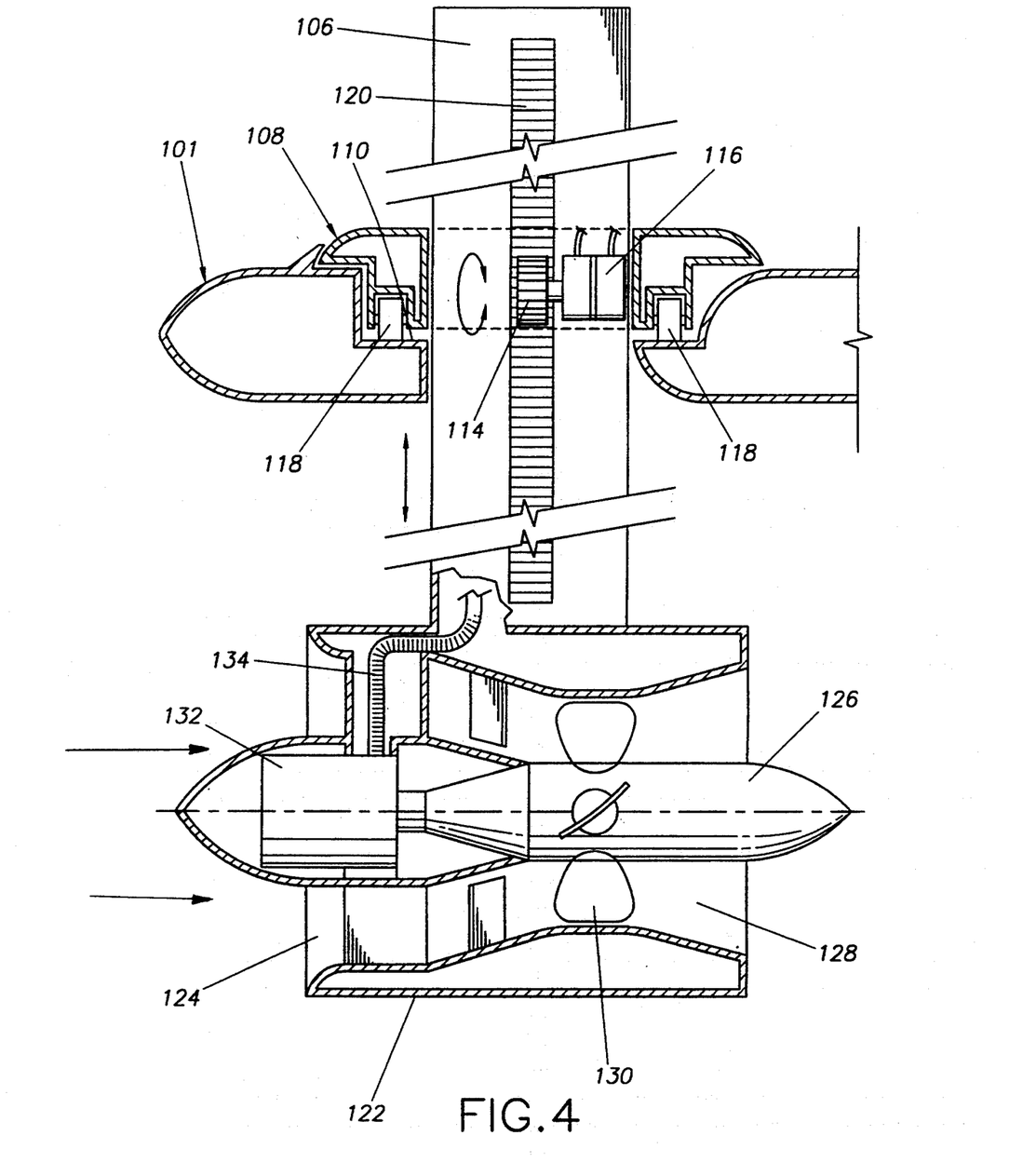
FIG. 4 is a side elevational view taken along line 4—4 of FIG. 3.

Referring now to FIG. 4 there is shown a side elevational view of the platform taken along line 4—4 of FIG. 3. In particular the carriage 108 is shown supported on the lateral support structure 110 by roller bearings 118. On the side of the column there is a gear rack 120 which is engaged by transmission 114 which is driven by power jack assembly 116. In combination the power jack assembly 116, the transmission 114 and the gear rack 120 work to raise or lower the vertical column 106 which supports the turbine/generator. At the lower end of the vertical column 106 is suspended the turbine/generator which comprises a turbine housing 122, a rotor 126 and a generator 132 connected to the rotor 126. The housing includes a flow inlet 124 which directs the current across the turbine blades 130 which turn the rotor 126 and drives the generator 132. The current exits the housing 122 at flow outlet 128. The power generated by the generator 132 is transmitted out by power output cable 134.

Figure 5:
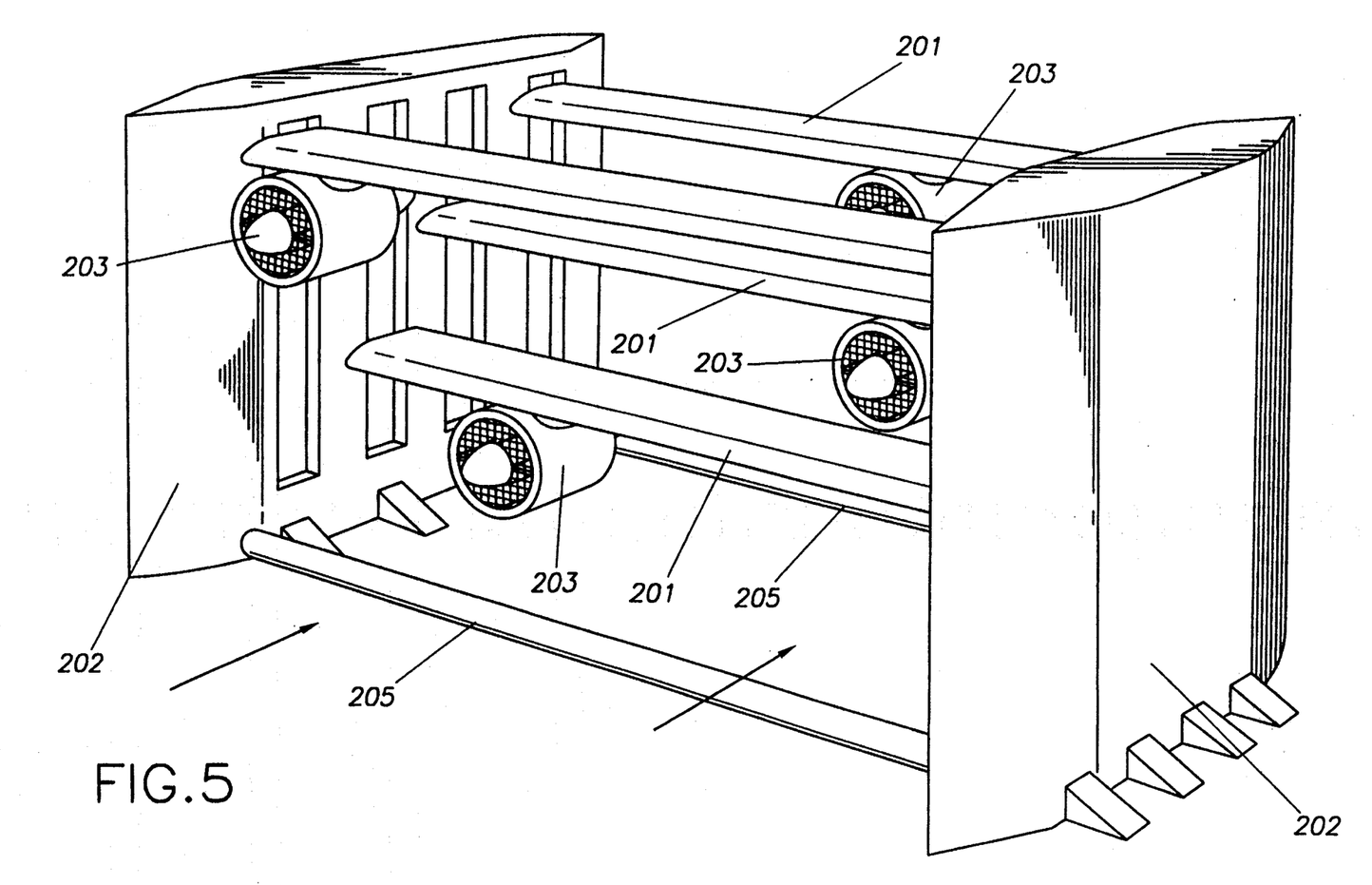
FIG. 5 is an isometric view of a second embodiment of the subsea hydroelectric plant of the present invention.
Figure 6:
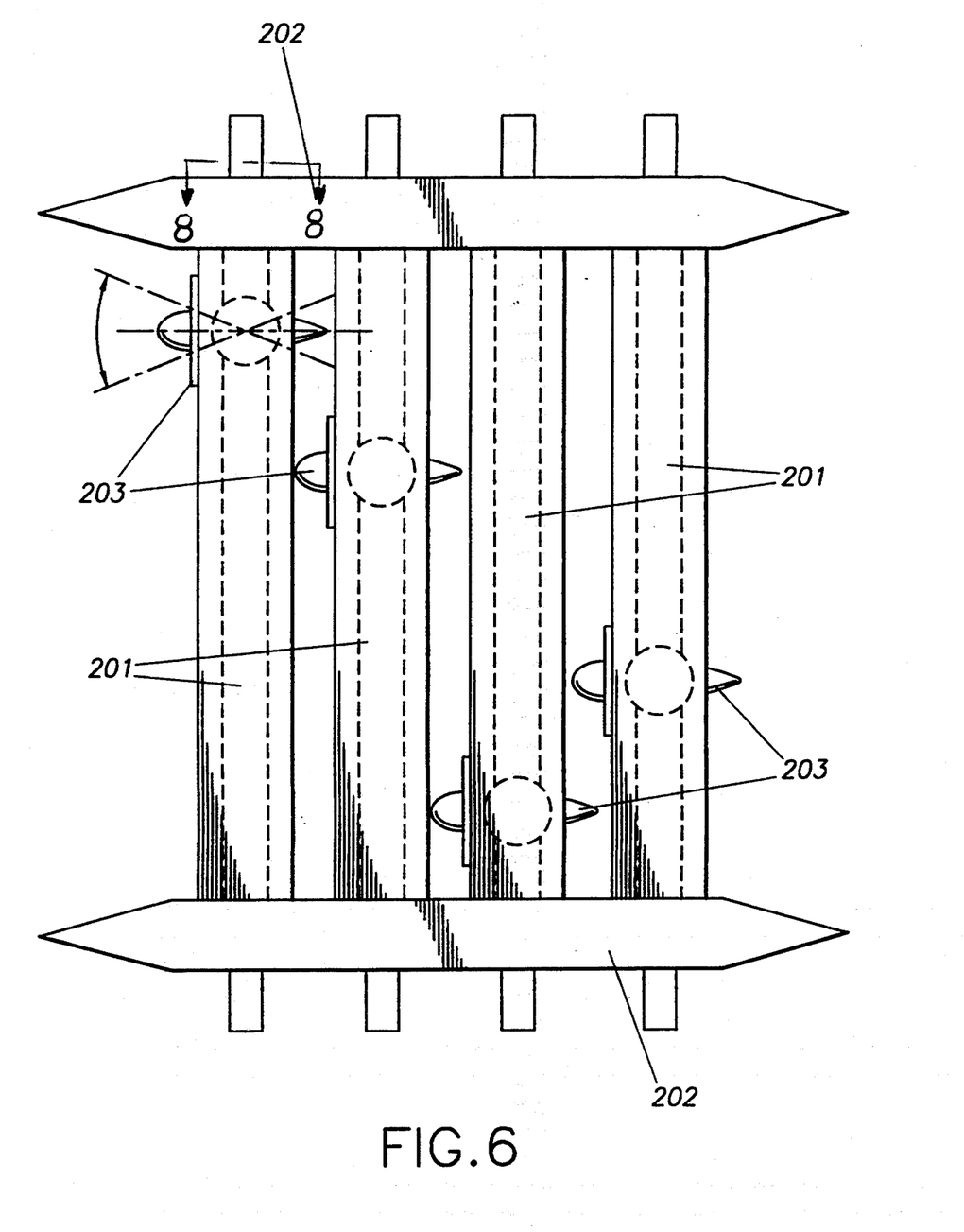
FIG. 6 is a top plan view of the subsea hydroelectric plant shown in FIG. 5.
Figure 7:
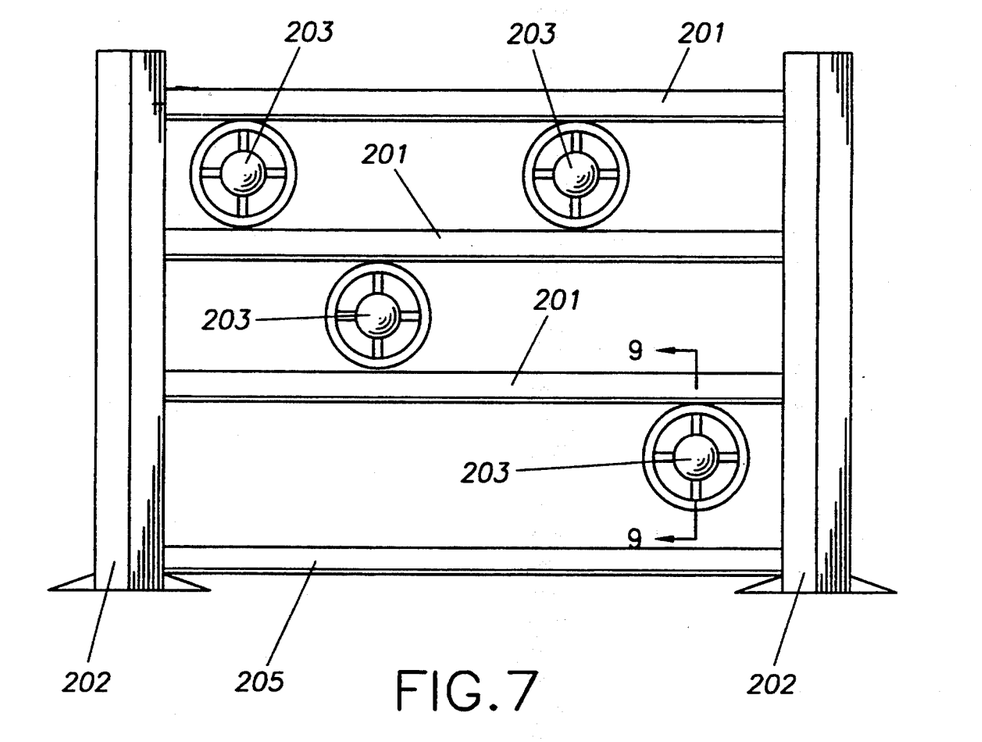
FIG. 7 is a front elevational view of the embodiment shown in FIG. 6.

Referring now to FIG. 5 an alternative embodiment of the subsea hydroelectric generating plant is shown. Instead of four tension legs and a single platform there are two side pillars 202 which rest on the ocean floor. Each turbine/generator 203 is suspended between the pillars 202 by rails 201 which may be raised or lowered individually. The individual turbine/generators 203 may be laterally along the rails 201. The two pillars 202 are connected by stationary beams 205 at the bottom. FIG. 6 depicts a top plan view of the embodiment shown in FIG. 5 while FIG. 7 depicts a front plan view. In addition to moving laterally on the rails 210 the individual turbine/generators my pivot or rotate in the horizontal plane.

Figure 8:
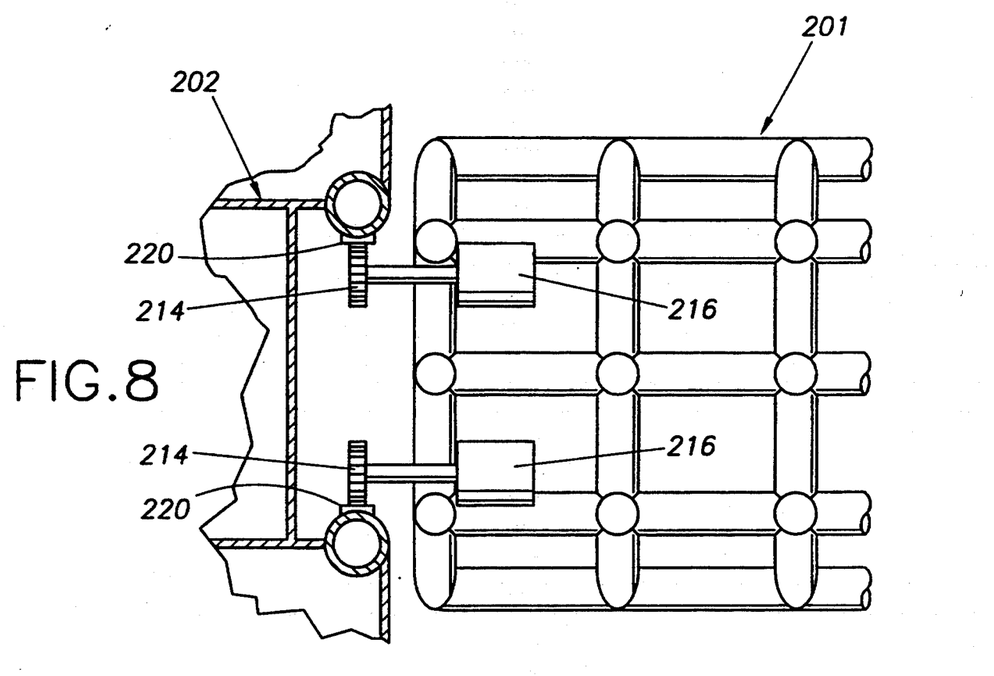
FIG. 8 is a view taken along line 8—8 of FIG. 6.

In FIG. 8 there is depicted further detail of the rail raising and lowering assembly of the embodiment shown in FIG. 5. Secured to the mobile beam 201 are the power jack assemblies 216 which drive the transmission 214 on the gear rack 220 located on the power pier structure 202.

Figure 9:
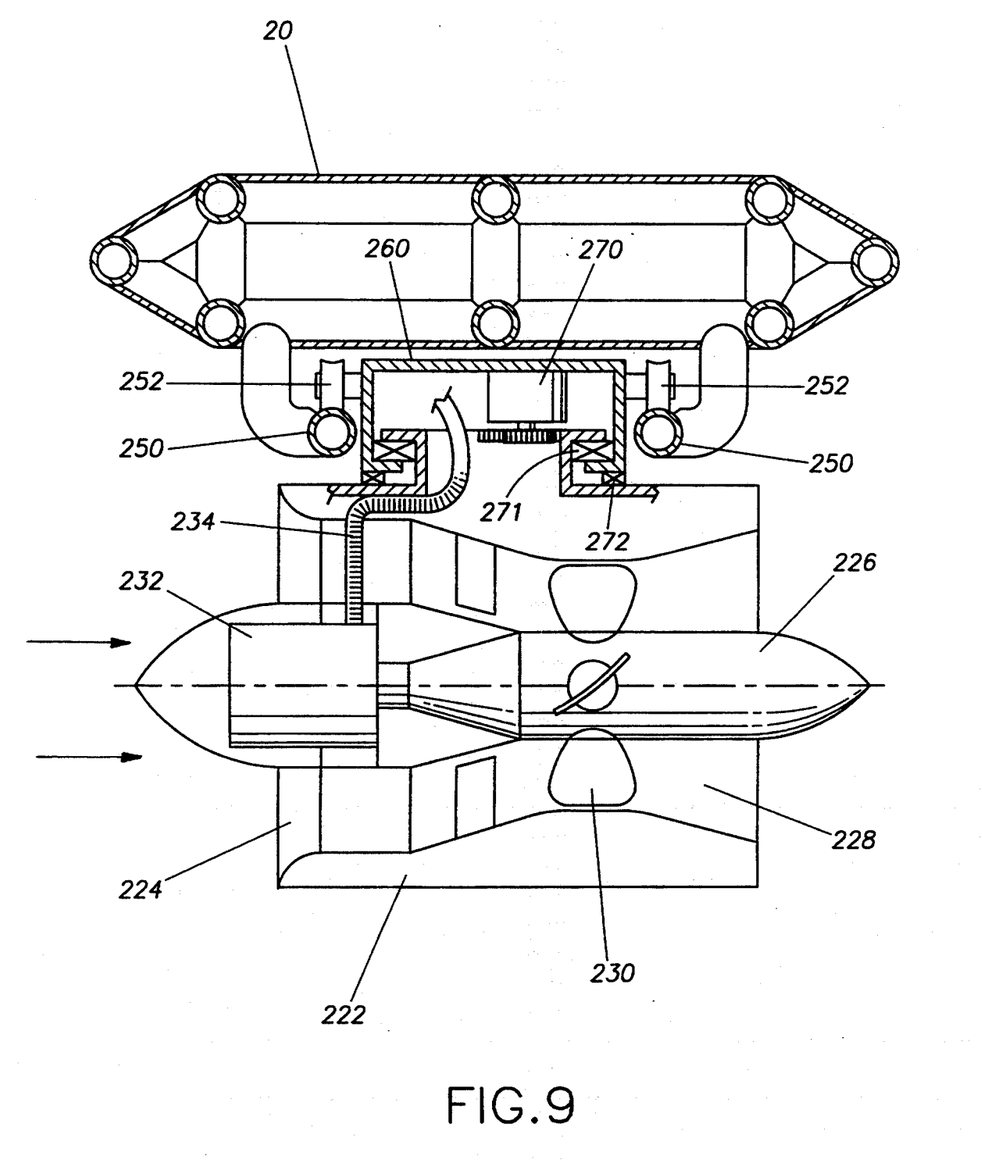
FIG. 9 is a side elevational view taken along line 9—9 in FIG. 7.

Referring now to FIG. 9 there is a side elevational view of the system showing a partial view of a turbine/generator suspended from a mobile beam 201. A carriage assembly 260 is suspended from the mobile beam 201 with a pair of drive rollers 252 resting on a matching pair of tubular racks 250. The turbine housing 222 is suspended from the carriage assembly. Within the housing 222 is the generator 232, turbine rotor 226 and rotor blade 230. A turbine rotation motor 270 is provided to rotate the turbine/generator about its horizontal axis to align the turbine flow inlet 224 and outlet 228 with the flow of the current.

As contemplated, the best mode includes the submerged tension leg type platform as depicted in FIGS. 1-3, situated on the ocean floor in an ocean current. The turbine/generator positioning equipment from FIGS. 4, 8 and 9 is also suitable for this application. After locating the platform on the ocean floor, the location and direction of the local ocean current is detected. The turbine/generators are maneuvered horizontally and vertically into the current and then they are oriented azimuthally to best utilize the current. The direction and location of the current is closely monitored and the turbine/generators are repositioned if a minor as well as a major change of the ocean current is detected. Electrical energy is transmitted to the power plant for distribution to customers.

The invention claimed is:

1. A subsea hydroelectric generating plant comprising a tension leg platform supported on the ocean floor and a plurality of water turbines driving electric generators independently supported by said platform such that each turbine may be independently raised or lowered, moved laterally and rotated in response to the movement of the ocean current.

2. The subsea hydroelectric generating plant of claim 1 further comprising a remotely positioned control station connected to said subsea hydroelectric generating plant.

3. The subsea hydroelectric generating plant of claim 2 further comprising control means to automatically position said plurality of turbines in the ocean current.

4. A subsea hydroelectric generating plant comprising:
 four adjustable height tension legs disposed substantially as the four corners of a square;
 a platform structure supported on said tension legs;
 a plurality of parallel lateral support structures extending across said platform structure;
 a combination turbine/generator supported on each of said plurality of lateral support structures by a vertical column; and
 a power jack means to raise and each of said vertical column.

5. A subsea hydroelectric generating plant comprising:
 two parallel elongated side pillars;
 a plurality of parallel mobile beams suspended between said side pillars;
 a combination turbine/generator supported on each of said plurality of mobile beams; and
 a power jack means to raise and lower each of said mobile beams.

6. The subsea hydroelectric generating plant of claim 5 further comprising a turbine rotation means to rotate each of said turbine/generators in the horizontal plane.

* * * * *